(12) United States Patent
Kimura et al.

(10) Patent No.: US 6,654,104 B2
(45) Date of Patent: Nov. 25, 2003

(54) APPARATUS AND METHOD FOR MEASURING OPTICAL CHARACTERISTICS AND RECORDING MEDIUM

(75) Inventors: Eiji Kimura, Tokyo (JP); Motoki Imamura, Tokyo (JP); Toshio Kawazawa, Tokyo (JP)

(73) Assignees: Advantest Corporation, Tokyo (JP); KDD Submarine Cable Systems, Inc., Tokyo (JP)

( * ) Notice: Subject to any disclaimer, the term of this patent is extended or adjusted under 35 U.S.C. 154(b) by 0 days.

(21) Appl. No.: 09/975,319

(22) Filed: Oct. 12, 2001

(65) Prior Publication Data

US 2002/0044273 A1 Apr. 18, 2002

(30) Foreign Application Priority Data

Oct. 13, 2000 (JP) ........................................ 2000-313601

(51) Int. Cl.[7] .............................................. G01N 21/00
(52) U.S. Cl. .................................................... 356/73.1
(58) Field of Search ................................ 356/73.1, 477, 356/365; 385/123–126, 24–27, 100; 359/179–189, 123–125, 161, 110, 158, 135, 109; 250/225, 227.14–227.18, 227.23

(56) References Cited

U.S. PATENT DOCUMENTS

| | | | | |
|---|---|---|---|---|
| 4,551,019 A | * | 11/1985 | Vella et al. ................. | 356/73.1 |
| 5,406,368 A | * | 4/1995 | Horiuchi et al. ............ | 356/73.1 |
| 5,557,694 A | | 9/1996 | Veith et al. | |
| 5,969,806 A | | 10/1999 | Bergano | |
| 6,373,609 B1 | * | 4/2002 | Mizrahi ...................... | 359/124 |

FOREIGN PATENT DOCUMENTS

JP       600140136 A     7/1985

* cited by examiner

Primary Examiner—Tu T. Nguyen
(74) Attorney, Agent, or Firm—Lowe Hauptman Gilman & Berner LLP (57) ABSTRACT

A technique for measuring optical characteristics includes providing a variable wavelength light source a fixed wavelength light source optical modulators for modulating the variable wavelength light and the fixed wavelength light, a fiber coupler for entering composite light generated by composing the variable wavelength light with the fixed wavelength light into a device under test, a circulator for extracting a variable wavelength light component from light transmitted through a fiber pair, and an optical filter for extracting a variable wavelength light component from the transmitted light, and measuring a phase difference of the variable wavelength light component with the fixed wavelength light component as a reference.

4 Claims, 7 Drawing Sheets

*Prior Art*

FIG. 7

*Prior Art*

APPARATUS AND METHOD FOR MEASURING OPTICAL CHARACTERISTICS AND RECORDING MEDIUM

BACKGROUND OF THE INVENTION

1. Field of the Invention

The present invention relates to measuring optical characteristics, such as chromatic dispersion characteristics of a DUT (Device Under Test) such as a fiber pair, and more specifically relays to measuring chromatic dispersion characteristics where independent measuring machines are connected tooth ends of the DUT.

2. Description of the Related Art

When light is transmitted over a long distance, losses are large if the light is transmitted only through an optical fiber. The loss can be prevented by using an optical fiber line where an optical fiber is combined with an optical amplifier (EDFA), which amplifies a light signal. The light amplifier allows light to pass in only a certain direction. For bi-directional communication, one optical fiber line for transmitting light in one direction, and another optical fiber line for transmitting light in a direction opposite to that one direction are combined as a cable. This cable is called one fiber pair.

Figure 6A:
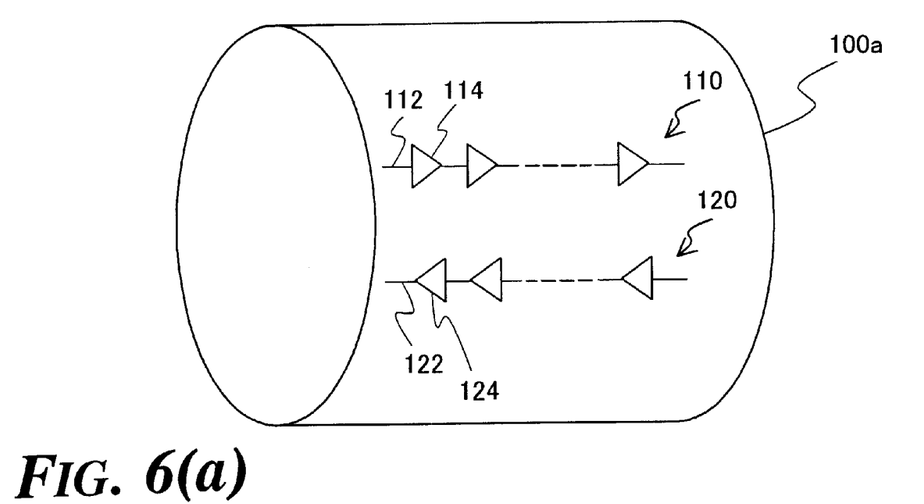
FIGS. 6(a)–6(b) are drawings showing a constitution of one fiber pair of the prior art.
Figure 6B:
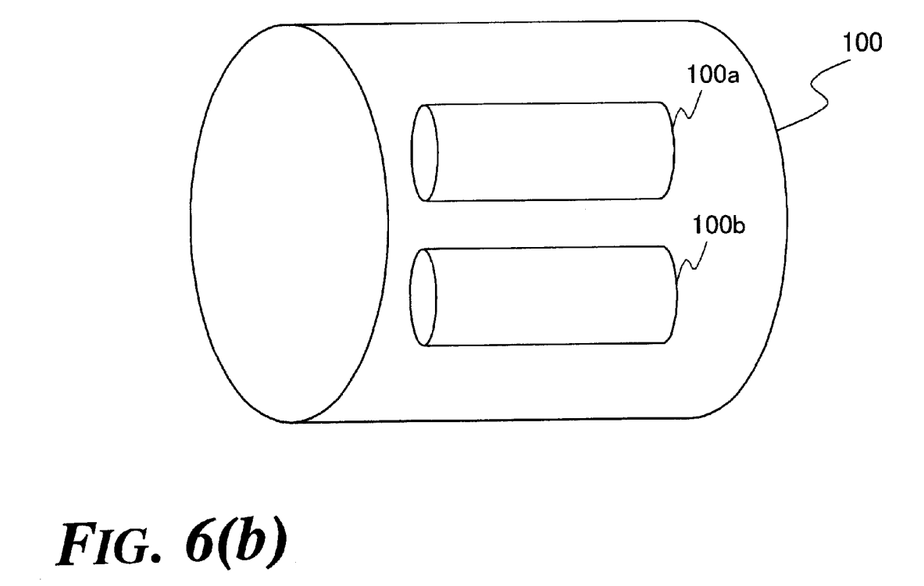

FIG. 6(a) shows a constitution of one fiber pair. An optical fiber line 110 is formed by combining an optical fiber 112 with optical amplifiers 114. The optical fiber line 110 passes light in the right direction of FIG. 6(a). The optical fiber line 120 is formed by combining an optical fiber 122 with optical amplifiers 124. The optical fiber line 120 passes light in the left direction of FIG. 6(a). The optical fiber line 110 and the optical fiber line 120 form one fiber pair 100a. Two fiber pairs are shown in FIG. 6(b). Fiber pairs 100a and 100b form two fiber pairs 100.

Figure 7:
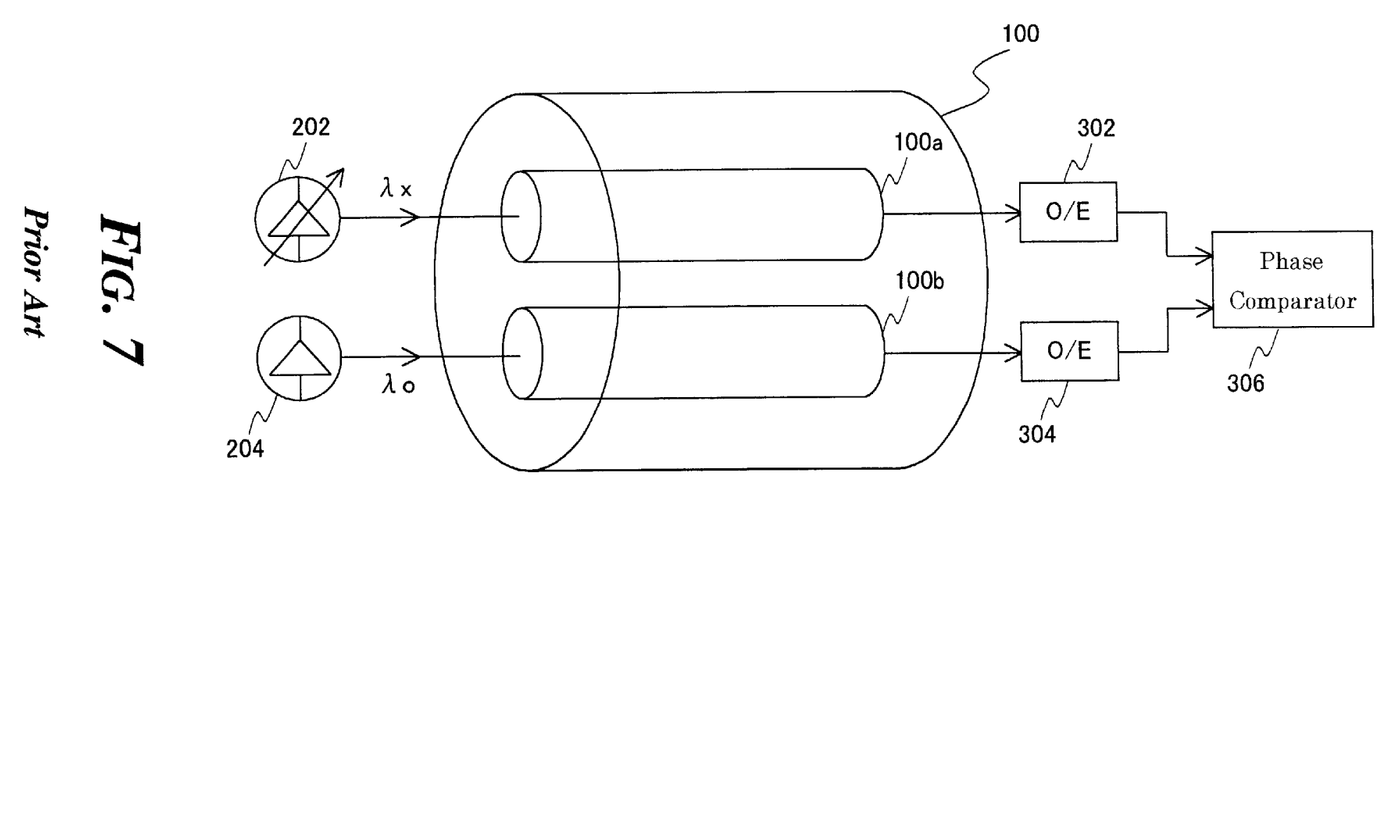
FIG. 7 is a drawing showing a constitution of a measuring system for measuring chromatic dispersion characteristic of two fiber pairs.

FIG. 7 shows a constitution of a measuring system when chromatic dispersion characteristics of two fiber pairs are measured. A variable wavelength light source 202 is connected to one end, and an O/E (optical/electrical) converter 302 is connected to the other end of one fiber pair 100a included in the two fiber pairs 100. A fixed wavelength light source 204 is connected to one end, and an O/E (optical/electrical) converter 304 is connected to the other end of one fiber pair 100b included in the two fiber pairs 100. Optical modulators may be provided between the variable wavelength light source 202 and the fiber pair 100a and/or between the fixed wavelength light source 204 and the fiber pair 100b.

For measuring the chromatic dispersion characteristic, the wavelength λx of variable wavelength light source 202 is swept (changed at a constant speed) while the wavelength λ0 of the fixed wavelength light source 204 is fixed. A phase comparator 306 measures a phase difference between an output signal from the O/E converter 302 and an output signal from the O/E converter 304, thereby measuring the wave dispersion characteristic of two fiber pairs.

In a high capacity transmission line in a trunk line system, it may be possible to use two fiber pairs. However, only one fiber pair can be used in most of the lines which have already been laid down. Thus it is necessary to measure the chromatic dispersion characteristic of one fiber pair.

SUMMARY OF INVENTION

The measuring method for the chromatic dispersion characteristic described above does not apply to one fiber pair. This is because two lines which pass light in the same direction and comprise a line for passing the fixed wavelength light and a line for passing the variable wavelength light are not available in one fiber pair.

When the measuring method for the chromatic dispersion characteristic described above is applied to the two fiber pairs 100, an error may be generated in a measured result. A difference between phases of light transmitted through the one fiber pair 100a and the one fiber pair 100b may change due to components which do not depend on wavelength when physical changes such as a temperature change or a stress change in the transmission line occur. In these cases, an error is generated in a measured result. It is desirable to use only one fiber pair instead of using two fiber pairs for measuring the chromatic dispersion characteristic.

The purpose of present invention is to provide an apparatus and the like for measuring the chromatic dispersion characteristic and the like with only one fiber pair.

According to the present invention, an optical characteristics measuring apparatus for measuring characteristics of light transmitted through a device under test may include: a variable wavelength light source for generating variable wavelength light, whose wavelength is variable a fixed wavelength light source for generating fixed wavelength light, whose wavelength is fixed a light modulating unit for modulating the variable wavelength light and the fixed wavelength light with a predetermined frequency a composite light generating unit for entering composite light composed of the variable wavelength light and the fixed wavelength light into the device under test a fixed wavelength component extracting unit for extracting the fixed wavelength light component from transmitted light, which is transmitted through the device under test and a variable wavelength component extracting unit for extracting the variable wavelength light component from the transmitted light.

According to the optical characteristics measuring apparatus constituted as described above, the fixed wavelength component extracting unit extracts the fixed wavelength light component from transmitted light transmitted through a device under test, and the variable wavelength component extracting unit extracts the variable wavelength light component from the transmitted light transmitted through the device under test. Thus, a phase difference of the variable wavelength light component is measured with the fixed wavelength light component as a reference. Since the phase difference is measured with one line for passing composite light, the measuring is possible when a device under test is one fiber pair.

According to the present invention, an optical characteristics measuring apparatus for measuring characteristics of light transmitted through a device under test includes: a variable wavelength light source for generating variable wavelength light, whose wavelength is variable a fixed wavelength light source for generating fixed wavelength light, whose wavelength is fixed a light modulating unit for modulating the variable wavelength light and the fixed wavelength light with a predetermined frequency and a composite light generating unit for entering composite incident light composed of the variable wavelength light and the fixed wavelength light into the device under test.

According to the present invention, an optical characteristics measuring apparatus for measuring characteristics of light transmitting device under test may include: a fixed wavelength component extracting unit for extracting a fixed wavelength light component from transmitted light, which is generated after light, which is composed of variable wavelength light whose wavelength is variable and fixed wavelength light whose wavelength is fixed, has been transmitted through the device under test and a variable wavelength component extracting unit for extracting the variable wavelength light component from the transmitted light.

In the present invention as described above the fixed wavelength light source may switch the wavelength of the fixed wavelength light.

In the present invention as described above, wherein the composite light generating unit may be a coupler.

In the present invention as described above, the variable wavelength component extracting unit may be an optical filter, which reflects the fixed wavelength light component, and transmits the variable wavelength light component, and the fixed wavelength component extracting unit may be a circulator, which has a first terminal for receiving the transmitted light, a second terminal for outputting the light received by the first terminal and for receiving inputted light, and a third terminal for outputting the light received by the second terminal, and wherein the second terminal is connected to the optical filter.

In the present invention as described above, the fixed wavelength light source may be provided with: a first fixed wavelength light source for generating first fixed wavelength light, a second fixed wavelength light source for generating second fixed wavelength light, an output terminal, and a switch for connecting the output terminal with either the first fixed wavelength light source or the second fixed wavelength light source.

In the present invention as described above, the device under test may have a first light path for passing light in only one direction, and a second light path for passing light in only one direction opposite to the one direction.

In the present invention as described above, the device under test may have a first light path for passing light in only one direction, and a second light path for passing light in only one direction opposite to the one direction, the variable wavelength light source, the fixed wavelength light source, the light modulating unit, and the composite light generating unit being connected to an entrance side, of the first light path, and the fixed wavelength component extracting unit and the variable wavelength component extracting unit being connected to an exit side of the second light path.

The present invention above, may further include: an optical/electrical converting unit for converting the fixed wavelength light component and the variable wavelength light component into electric signals a phase comparing unit for measuring a phase difference between the electric signal corresponding to the fixed wavelength light component, and the electric signal corresponding to the variable wavelength light component and a characteristics calculating unit for calculating group delay characteristic or dispersion characteristic of the device under test by using the phase difference.

According to the present invention, an optical characteristics measuring method for measuring characteristics of light transmitted through a device under test may include: a variable wavelength light generating step for generating variable wavelength light, whose wavelength is variable a fixed wavelength light generating step for generating fixed wavelength light, whose wavelength is fixed a light modulating step for modulating the variable wavelength light and the fixed wavelength light with a predetermined frequency a composite light generating step for entering composite light composed of the variable wavelength light and the fixed wavelength light into the device under test a fixed wavelength component extracting step for extracting the fixed wavelength light component from transmitted light, which is transmitted through the device under test and a variable wavelength component extracting step for extracting the variable wavelength light component from the transmitted light.

According to the present invention, an optical characteristics measuring method for measuring characteristics of light transmitted through a device under test may include: a variable wavelength light generating step for generating variable wavelength light, whose wavelength is variable a fixed wavelength light generating step for generating fixed wavelength light, whose wavelength is fixed a light modulating step for modulating the variable wavelength light and the fixed wavelength light with a predetermined frequency and a composite light generating step for entering composite incident light composed of the variable wavelength light and the fixed wavelength light into the device under test.

According to the present invention, an optical characteristics measuring method for measuring characteristics of light transmitting device under test may include: a fixed wavelength component extracting step for extracting a fixed wavelength light component from transmitted light, which is generated after light, which is composed of variable wavelength light whose wavelength is variable and fixed wavelength light whose wavelength is fixed, has been transmitted through the device under test; and a variable wavelength component extracting step for extracting the variable wavelength light component from the transmitted light.

The present invention may also be a computer-readable medium having a program of instructions for execution by the computer to perform an optical characteristics measuring process for measuring characteristics of light transmitted through a device under test, the optical characteristics measuring process including: a variable wavelength light generating processing for generating variable wavelength light, whose wavelength is variable a fixed wavelength light generating processing for generating fixed wavelength light, whose wavelength is fixed a light modulating processing for modulating the variable wavelength light and the fixed wavelength light with a predetermined frequency a composite light generating processing for entering composite light composed of the variable wavelength light and the fixed wavelength light into the device under test a fixed wavelength component extracting processing for extracting the fixed wavelength light component from transmitted light, which is transmitted through the device under test and a variable wavelength component extracting processing for extracting the variable wavelength light component from the transmitted light.

The present invention may be a computer-readable medium having a program of instructions for execution by the computer to perform an optical characteristics measuring process for measuring characteristics of light transmitted through a device under test, the optical characteristics measuring process including: a variable wavelength light generating processing for generating variable wavelength light, whose wavelength is variable a fixed wavelength light generating processing for generating fixed wavelength light, whose wavelength is fixed a light modulating processing for modulating the variable wavelength light and the fixed wavelength light with a predetermined frequency and a composite light generating processing for entering composite incident light composed of the variable wavelength light and the fixed wavelength light into the device under test.

The present invention may be a computer-readable medium having a program of instructions for execution by the computer to perform an optical characteristics measuring process for measuring characteristics of light transmitted through a device under test, the optical characteristics measuring process including: a fixed wavelength component extracting processing for extracting a fixed wavelength light component from transmitted light, which is generated after light, which is composed of variable wavelength light whose wavelength is variable and fixed wavelength light whose wavelength is fixed, has been transmitted through the device under test and a variable wavelength component extracting processing for extracting the variable wavelength light component from the transmitted light.

BRIEF DESCRIPTION OF THE DRAWING

FIGS. 2(a) and 2(b) are flow clients shows Flowcharts showing an operation of Embodiment 1 of the present invention where

DESCRIPTION OF THE PREFERRED EMBODIMENTS

The following section describes embodiments of the present invention referring to drawings.

Embodiment 1

Figure 1:
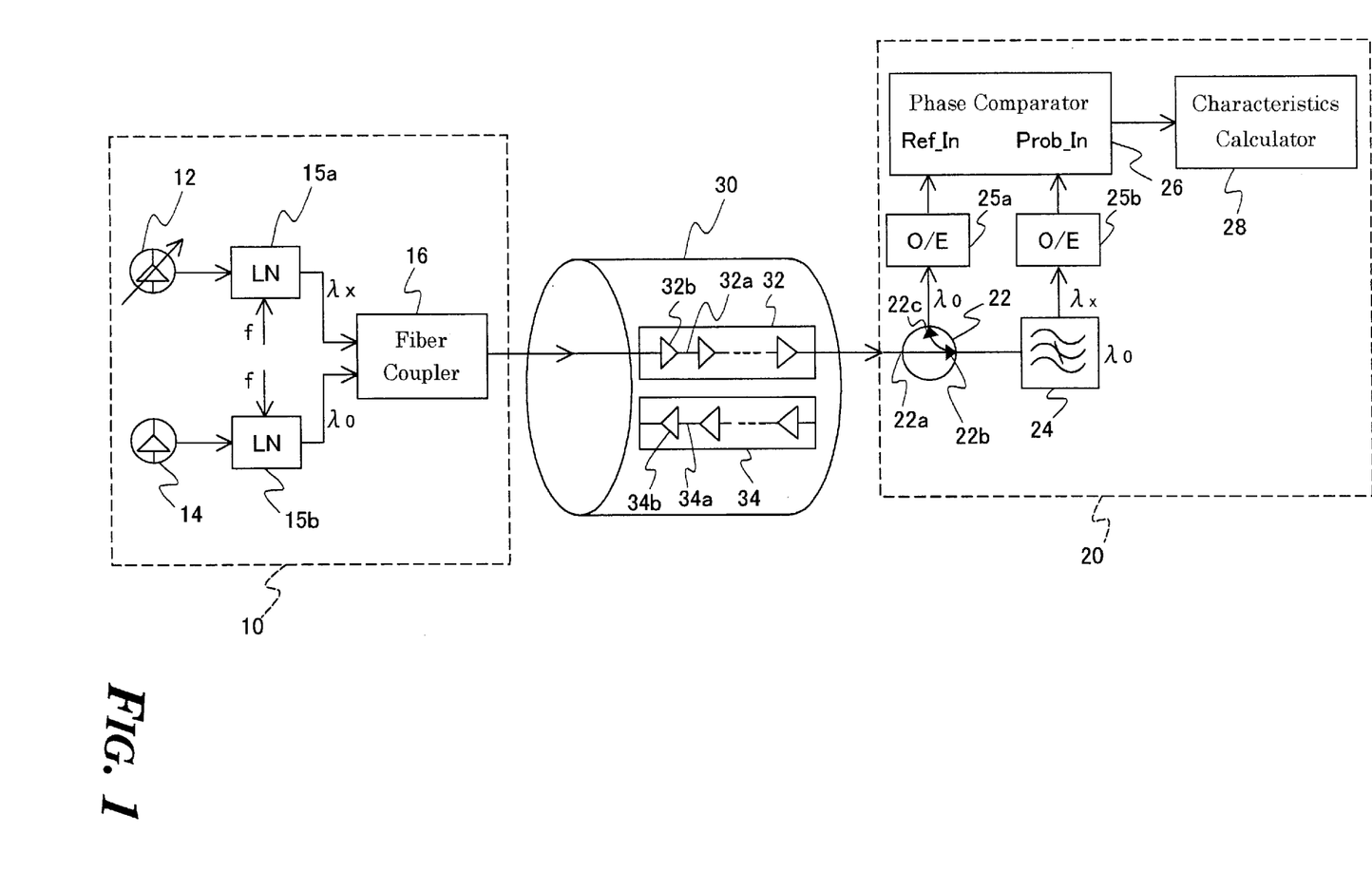
FIG. 1 is a block diagram showing a constitution of an optical characteristics measuring apparatus relating to Embodiment 1 of the present invention

FIG. 1 is a block diagram showing a constitution of an optical characteristics measuring apparatus relating to Embodiment 1 of the present invention. The optical characteristics measuring apparatus relating to Embodiment 1 includes a light source system 10 connected to one end of one fiber pair 30, and a characteristics measuring system 20 connected to the other end of one fiber pair 30.

The one fiber pair 30 includes an optical fiber line 32 and an optical fiber line 34. The fiber line 32 includes an optical fiber 32a, and an optical amplifier 32b; which is connected in the middle of optical fiber 32a, and amplifies light. The optical fiber line 32 passes light in the right direction of FIG. 1. The optical fiber line 34 includes an optical fiber 34a, and an optical amplifier 34b, which is connected in the middle of optical fiber 34a, and amplifies light. The optical fiber line 34 passes light in the left direction of FIG. 1.

It is assumed that to measure the optical fiber line 32 in Embodiment 1, the light source system 10 is connected to an entrance side (left side) of the optical fiber line 32, and the characteristics measuring system 20 is connected to an exit side (right side) of the optical fiber line 32. When the optical fiber line 34 is measured, the light source system 10 is connected to an entrance side (right side) of the optical fiber line 34, and the characteristics measuring system 20 is connected to an exit side (left side) of the optical fiber line 34.

The light source system 10 is provided with a variable wavelength light source 12, a fixed wavelength light source 14, optical modulators 15a and 15b, and a fiber coupler 16. The variable wavelength light source 12 generates variable Wavelength light whose wavelength is variable. The variable wavelength light source 12 sweeps the wavelength $\lambda x$ of variable wavelength light. The fixed wavelength light source 14 generates fixed wavelength light whose wavelength is fixed to $\lambda 0$. Since the wavelength of fixed wavelength light is fixed, it is not affected by the wavelength dispersion. The optical modulator 15a modulates the variable wavelength light with frequency £ The optical modulator 15b modulates the fixed wavelength light with the frequency £ The optical modulators 15a and 15b may include lithium niobate (LN). As long as they can modulate light, they do not necessarily include LN. The fiber coupler 16 composes the variable wavelength light with the fixed wavelength light to generate composite light, and enters it into the optical fiber line 32.

The composite light having entered into the optical fiber line 32 is transmitted through the optical fiber line 32. The light which has been transmitted through the optical fiber line 32 is referred as transmitted light.

The characteristics measuring system 20 is provided with a circulator 22, an optical filter 24, optical/electrical converters 25a and 25b, a phase comparator 26, and a characteristics calculator 28. The circulator 22 includes a first terminal 22a, a second terminal 22b, and a third terminal 22c. The circulator 22 provides light from the first terminal 22a, the second terminal 22b, and the third terminal 22c in this sequence. In other words, light which enters the first terminal 22a exits from the second terminal 22b. The light which enters the second terminal 22b exits from the third terminal 22c. The first terminal 22a receives the transmitted light. The second terminal 22b provides the transmitted light received by the first terminal 22a, and receives light. The third terminal 22c provides light received by the second terminal 22b.

An optical filter 24 is connected to the second terminal 22b of circulator 22. The optical filter 24 reflects the fixed wavelength light component (wavelength $\lambda 0$) of transmitted light, and transmits the variable wavelength light component (wavelength $\lambda x$).

The optical/electrical converter 25a converts light, which exits from the third terminal 22c of circulator 22, into an electrical signal. The optical/electrical converter 25b converts light, which has transmitted through the optical filter 24, into an electrical signal.

The phase comparator 26 receives the electrical signal generated from the optical/electrical converter 25a on a terminal Ref_In, and receives the electrical signal generated from the optical/electrical converter 25b on a terminal Prob_In. The phase comparator 26 measures the phase of electrical signal received on the terminal Prob_In with the electrical signal received on the terminal Ref In as a reference.

The characteristics calculator 28 calculates group delay characteristic and chromatic dispersion characteristic of the optical fiber line 32 based on the phase measured in the phase comparator 26. The group delay characteristic is calculated from a relationship between the phase measured by the phase comparator 26 and the modulating frequency £.

The chromatic dispersion characteristic is obtained by differentiating the group delay characteristic with the wavelength.

Figure 2A:
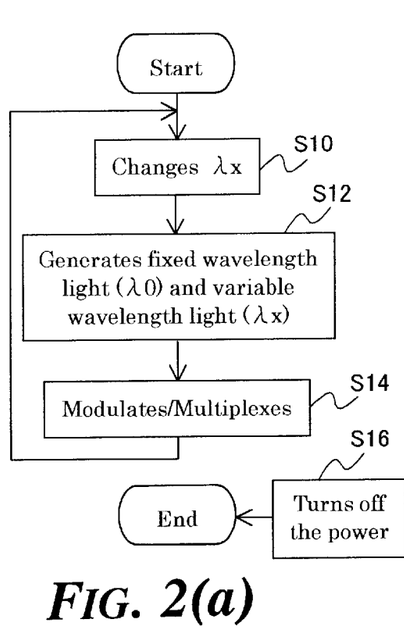
FIG. 2(a) presents an operation of a light, source system 10.
Figure 2B:
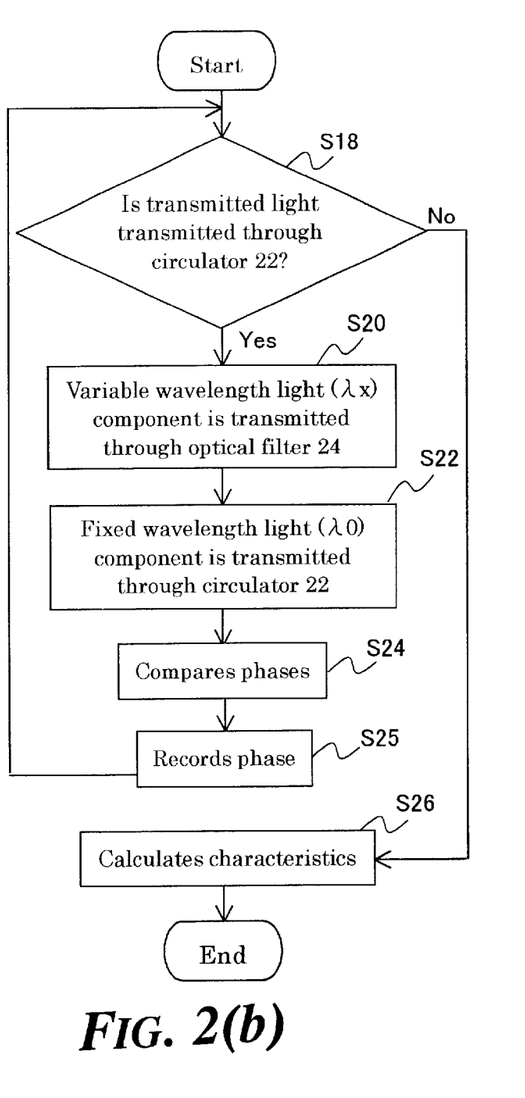
FIG. 2(b) presents an operation of a characteristics measuring system 20.

The following section describes an operation of Embodiment 1 of the present invention while referring to the flowcharts FIGS. 2(a)–2(b). FIG. 2(a) is a flowchart for indicating an operation of the light source system 10, and FIG. 2(b) is a flowchart for indicating an operation of the characteristics measuring system 20. With reference to FIG. 2(a), the wavelength λx of variable wavelength light is changed (S10). Then, the variable wavelength light (λ=λx) is generated from the variable wavelength light source 12, and the fixed wavelength light (λ=λ0) is generated from the fixed wavelength light source 14. Then, the variable wavelength light and the fixed wavelength light are modulated respectively in the optical modulators 15a and 15b, and are multiplexed in the fiber coupler 16 (S14). The light coupled in the fiber coupler 16 is composite light. The composite light enters into the one fiber pair 30. Then, the procedure returns to the change (sweep) of wavelength λx of variable wavelength light (S10). The procedure ends when the power is turned off (S16) at any time.

The composite light is transmitted through the optical fiber line 32. The light which is transmitted through the optical fiber line 32 is called transmitted light.

The following section refers to FIG. 2(b). The characteristic measuring system 20 determines whether the transmitted light is transmitted through the circulator 22 (S18). When the characteristics measuring system 20 is receiving the transmitted light, the transmitted light enters the first terminal 22a of circulator 22, and exits from the second terminal 22b. In other words, the transmitted light is transmitted through the circulator 22 (S 18, Yes). The transmitted light enters the optical filter 24. Since the optical filter 24 transmits light whose wavelength is other than that of the fixed wavelength light (λ=λ0), the variable wavelength light (λ=λx) component is transmitted through the optical filter 24 (S20).

Since the optical filter 24 reflects the fixed wavelength light (λ=λ0), the fixed wavelength light component of transmitted light is reflected on the optical filter 24, and enters into the second terminal 22b of circulator 22. The fixed wavelength light component which has entered into the second terminal 22b exits from the third terminal 22c. In other words, the fixed wavelength light component is transmitted through the circulator 22 (S22).

The fixed wavelength light component is applied with optical/electrical conversion by the optical/electrical converter 25a, and inputted to the terminal Ref In of phase comparator 26. The variable wavelength light component is applied with optical/electrical conversion by the optical/electrical converter 25b, and inputted to the terminal Prob_In of phase comparator 26. The phase comparator measures a phase of the electrical signals received on the terminal Prob_In based on the electrical signal received on the terminal Ref_In (S24). The measured phase is recorded in the characteristics calculator 28 (S25). The procedure returns to the determination as to whether or not the transmitted light is transmitted through the circulator 22, in other words, whether or not the characteristics measuring system 20 receives the transmitted light (S18).

If the transmitted light is not transmitted through the circulator 22 (S18, No), the characteristics measuring system 20 does not receive the transmitted light. Then, the characteristics calculator 28 calculates the group delay characteristic and the chromatic dispersion characteristic of optical fiber line 32 (S26). The group delay characteristic is calculated from relationship between the phase measured by the phase comparator 26 and the modulating frequency f. The chromatic dispersion characteristic is obtained by differentiating the group delay characteristic with the wavelength.

According to Embodiment 1, it is possible to measure the chromatic dispersion and the like even if only one fiber pair is available.

Embodiment 2

Optical characteristics measuring apparatuses relating to Embodiment 2 differ from Embodiment 1 in that the light source systems 10 and the characteristics measuring systems 20 are provided on the same side of one fiber pair 30.

Figure 3:
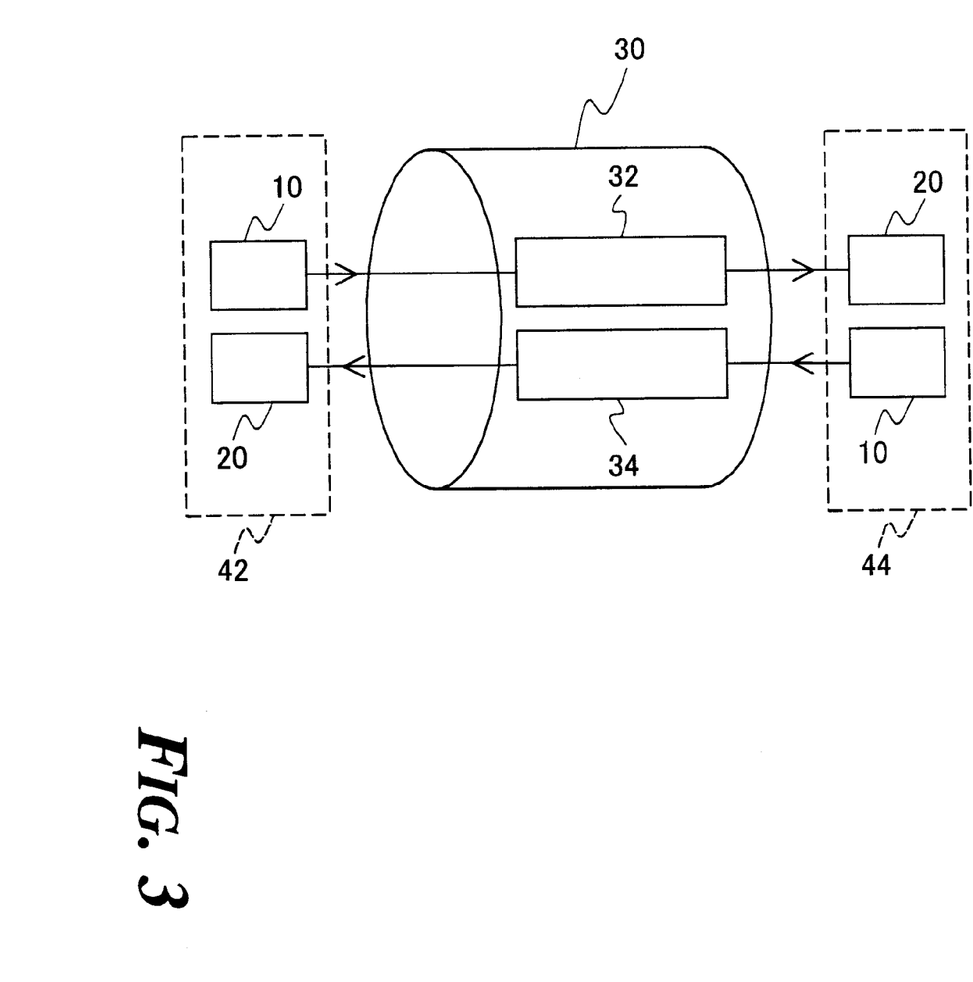
FIG. 3 is a block diagram showing a constitution of optical characteristics measuring apparatus relating to Embodiment 2.

FIG. 3 is a block diagram showing an overview of the constitution of optical characteristics measuring apparatuses relating to Embodiment 2.

The optical characteristics measuring apparatuses 42 and 44 relating to Embodiment 2 are respectively provided with the light source system 10 and the characteristics measuring system 20. Since the internal constitutions of the light source system 10 and the characteristics measuring system 20 are the same as those for Embodiment 1, they are omitted in the drawing.

The light source system 10 in optical characteristics measuring apparatus 42 is connected to an entrance side of the optical fiber line 32 (first optical line). The characteristics measuring system 20 of optical characteristics measuring apparatus 42 is connected to an exit side of the optical fiber line 34 (second optical line).

The light source system 10 in the optical characteristics measuring apparatus 44 is connected to an entrance side of the optical fiber line 34 (second optical line). The characteristics measuring system 20 of the optical characteristics measuring apparatus 42 is connected to an exit side of the optical fiber line 32 (first optical line).

The operation of Embodiment 2 is the same as that of Embodiment 1.

According to Embodiment 2, both the optical fiber lines 32 and 34 of one fiber pair 30 are measured.

Embodiment 3

An optical characteristics measuring apparatus relating to Embodiment 3 differs from Embodiment 1 and Embodiment 2 with respect to the internal constitution of light source system 10. The difference is that it is prevented that measuring becomes disabled when the wavelength λx of variable wavelength light becomes the same as the wavelength λ0 of fixed wavelength light.

Figure 4:
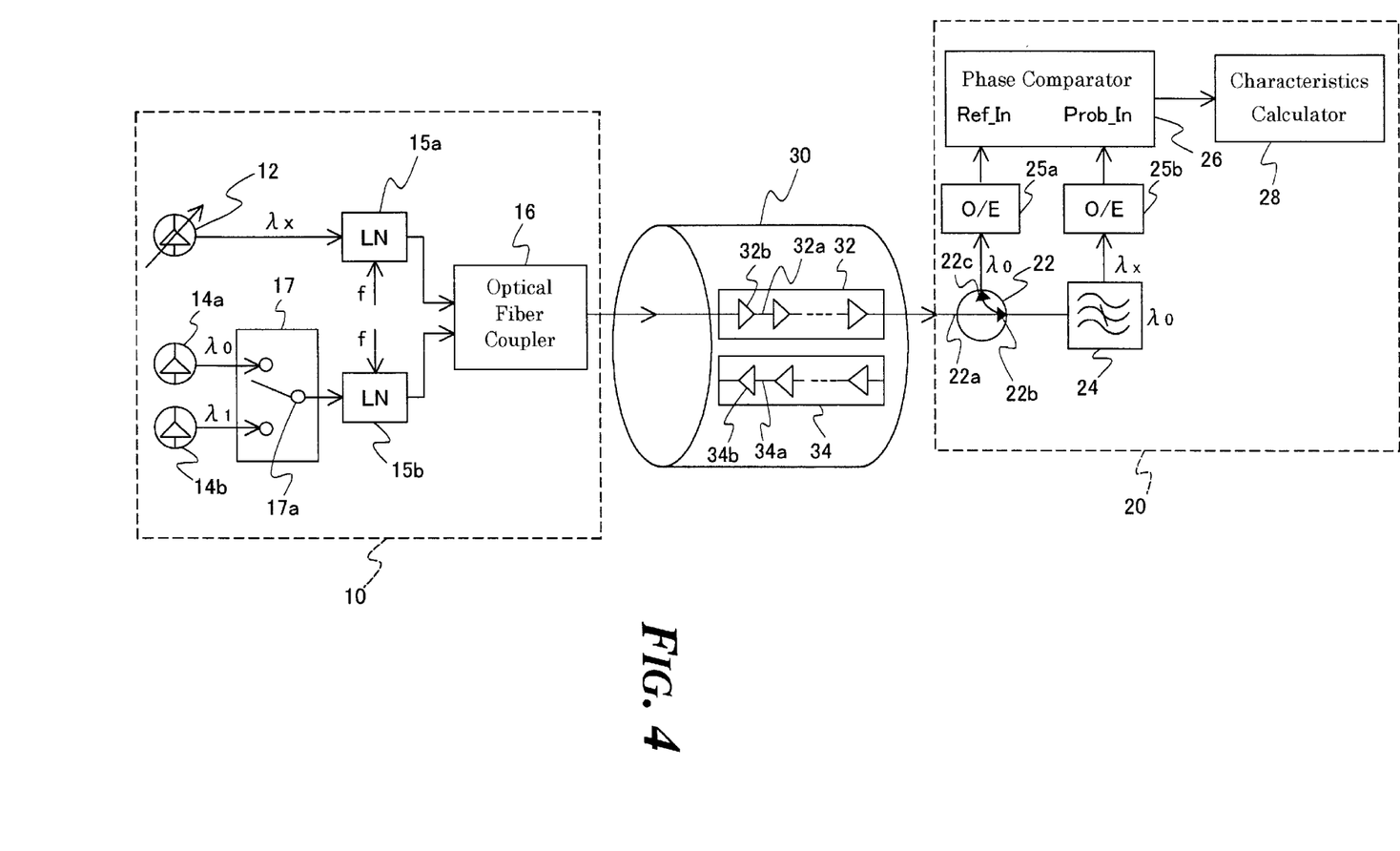
FIG. 4 is a block diagram showing a constitution of optical characteristics measuring apparatus relating to Embodiment 3.

FIG. 4 is a block diagram showing a constitution of the optical characteristics measuring apparatus relating to Embodiment 3 of the present invention. The optical characteristics measuring apparatus relating to Embodiment 3 includes a light source system 10 connected to one end of one fiber pair 30, and a characteristics measuring system 20 connected to the other end of one fiber pair 30.

The light source system 10 is provided with a variable wavelength light source 12, a first fixed wavelength light source 14a, a second fixed wavelength light source 14b, optical modulators 15a and 15b, a fiber coupler 16, and a switch 17, and an output terminal 17a.

The variable wavelength light source 12 generates variable wavelength light whose wavelength is variable. The variable wavelength light source 12 sweeps the wavelength λx of variable wavelength light. The first fixed wavelength light source 14a generates first fixed wavelength light whose wavelength is fixed to λ0. Since the wavelength of first fixed wavelength light is fixed to λ0, it is not affected by the wavelength dispersion. The second fixed wavelength light source 14b generates second fixed wavelength light whose wavelength is fixed. It is desirable that the wavelength of second fixed wavelength light is fixed to λ1, which is in the neighborhood of wavelength λ0. The switch 17 connects either one of the first fixed wavelength light source 14a or the second fixed wavelength light source 14b with the output terminal 17a. The switch 17 also determines whether the λx is equal to λ0.

The optical modulator 15a modulates the variable wavelength light with the frequency £ The optical modulator 15b modulates the fixed wavelength light with the frequency £. The optical modulators 15a and 15b may include the lithium niobate (LN). As long as they can modulate light, they do not necessarily include LN. The fiber coupler 16 composes the variable wavelength light with the fixed wavelength light to generate composite light, and enters it into the optical fiber line 32.

The constitutions of one fiber pair 30 and the characteristics measuring system 20 are the same as those in Embodiment 1.

Figure 5:
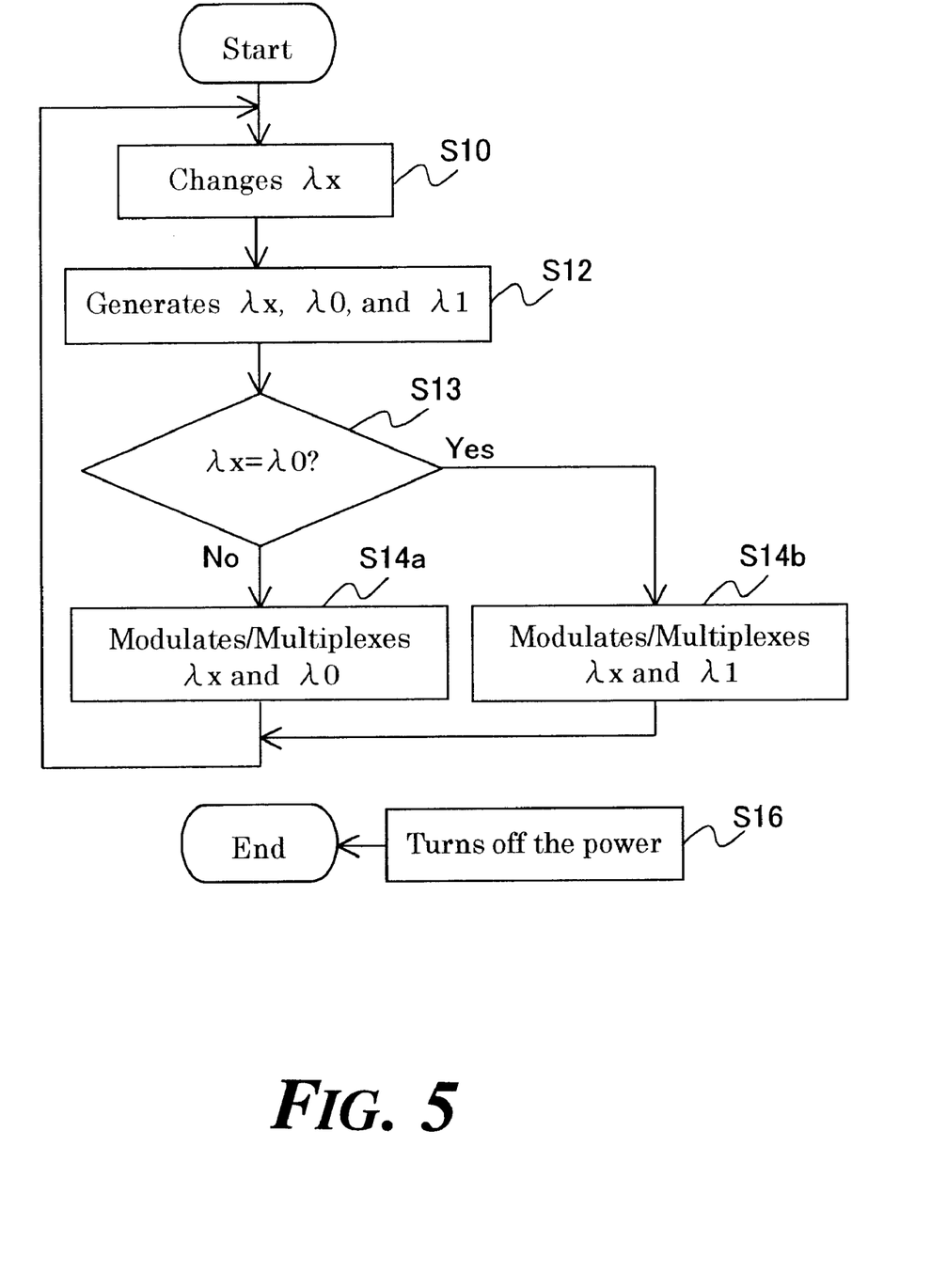
FIG. 5 is a flow chart showing Embodiment 3 of the present invention

The following section describes an operation of Embodiment 3 of the present invention while referring to a flowchart in FIG. 5. The wavelength A.x of variable wavelength light is changed (S10). Then, the variable wavelength light (λ=λx) is generated from the variable wavelength light source 12, the first fixed wavelength light (01=,10) is generated from the fixed wavelength light source 14a, and the second fixed wavelength light (λ=λ1) is generated from the fixed wavelength light source 14b (S12). Then, it is determined whether λx is equal to λO (S13).

The group delay characteristic and the like of a device under test such as one fiber pair are measured based on a phase difference between a phase when light with a certain wavelength passes and a phase when light with a different wavelength passes. If λx=λ0, they have the same wavelength, and the group delay characteristic and the like are not obtained. Therefore, the wavelength of the fixed wavelength light should not be λ0.

Unless λx=λ0 (S13, No), the switch 17 connects between the output terminal 17a and the first wavelength light source 14a. Therefore, the variable wavelength light and the first fixed wavelength light are respectively modulated in the optical modulators 15a and 15b, and are multiplexed in the fiber coupler 16 (S14a). The light composed in the fiber coupler 16 is composite light. The composite light enters into the one fiber pair 30. Then, the procedure returns to the change (sweep) of wavelength λx of variable wavelength light (S10). The procedure ends when the power is turned off (S16) at any time.

The operation of characteristics measuring system 20 is the same as that of Embodiment 1.

According to Embodiment 3, when the wavelength λx of variable wavelength light is equal to the wavelength λO of first fixed wavelength light and it is impossible to measure the group delay characteristics and the like, multiplexing the second fixed wavelength light (wavelength λ1) with the variable wavelength light enables measuring the group delay characteristic and the like.

The Embodiments described above are also realized as follows. A computer provided with a CPU, a hard disk, and a medium reading apparatus (such as a floppy disk and a CD-ROM) reads a medium storing a program for realizing the individual parts described above in the medium reading apparatus, and installs the program on the hard disk. This method also realizes the function described above.

According to the present invention, group delay characteristics and the like can be measured when a device under test is one fiber pair.

What is claimed is:

1. An apparatus for measuring characteristics of light transmitted through a device under test, the apparatus comprising:

a variable wavelength light source to generate variable wavelength light whose wavelength is variable;

a fixed wavelength light source to generate fixed wavelength light whose wavelength is fixed;

a light modulator to modulate said variable wavelength light and said fixed wavelength light with a predetermined frequency;

a composite light generator for inputting composite light composed of said variable wavelength light and said fixed wavelength light into the device under test;

a variable wavelength component extractor to extract a variable wavelength light component from transmitted light which has been transmitted through the device under test, by reflecting a fixed wavelength light component and transmitting said variable wavelength light component; and a fixed wavelength component extractor to extract said fixed wavelength light component from said transmitted light by obtaining said fixed wavelength light component reflected by said variable wavelength component extractor;

wherein said fixed wavelength light source is switched by a light switching means; and wherein said fixed wavelength light source comprises:
a first fixed wavelength light source for generating a first fixed wavelength light;
a second fixed wavelength light source for generating a second fixed wavelength light;
and output terminal; and
a switch for connecting said output terminal to either said first fixed wavelength light source or said second fixed wavelength light source.

2. The optical characteristics measuring apparatus as claimed in claim 1, wherein said switch connects
said output terminal to said second fixed wavelength light source upon said variable wavelength having a wavelength which is equal to said first fixed wavelength.

3. A method of measuring characteristics of light transmitted through a device under test, the method comprising:

a variable wavelength light generating step for generating a variable wavelength light whose wavelength is variable;

a fixed wavelength light generating step for generating a fixed wavelength light whose wavelength is fixed;

a light modulating step for modulating said variable wavelength light said fixed wavelength light with a predetermined frequency;

a composite light generating step for inputting composite light composed of said variable wavelength light and said fixed wavelength light into the device under test;

a variable wavelength component extracting step for extracting a variable wavelength light component from transmitted light which has been transmitted through said device under test by reflecting a fixed wavelength light component and transmitting said variable wavelength light component; and a fixed wavelength component extracting step for extracting said fixed wavelength light component from said transmitted light by obtaining said fixed wavelength light component which has been reflected in the variable wavelength component extracting means;

wherein said fixed wavelength light source is switched by a light switching means; and wherein said fixed wavelength light source generates a first fixed wavelength light with a first fixed wavelength light source and generates a second fixed wavelength light with a second fixed wavelength light source and connects said output terminal to either said first fixed wavelength light source or said second fixed wavelength light source with a switch.

4. A computer-readable medium having a program of instructions for execution by the computer to perform an optical characteristics measuring process for measuring characteristics of light transmitted through a device under test, said optical characteristics measuring process comprising:

a variable wavelength light generating a processing for generating variable wavelength light whose wavelength is variable;

a fixed wavelength light generating processing for generating a fixed wavelength light whose wavelength is fixed;

a light modulating processing for modulating said variable wavelength light and said fixed wavelength light with a predetermined frequency;

a composite light generating processing for inputting composite light composed of said variable wavelength light and said fixed wavelength light into the device under test;

a variable wavelength component extracting processing for extracting a variable wavelength light component from transmitted light a which has been transmitted through the device under test, by reflecting a fixed wavelength light component and transmitting said variable wavelength light component; and a fixed wavelength component extracting processing for extracting said fixed wavelength light component from said transmitted light by obtaining said fixed wavelength light component which has been reflected in the variable wavelength component extracting means;

wherein, in the fixed wavelength light generating processing, a fixed wavelength light source is switched by a light switching means and generates a first fixed wavelength light with a first fixed wavelength light source and generates a second fixed wavelength light with a second fixed wavelength light source and connects said output terminal to either said first fixed wavelength light source or said second fixed wavelength light source.

* * * * *